Patented June 14, 1927.

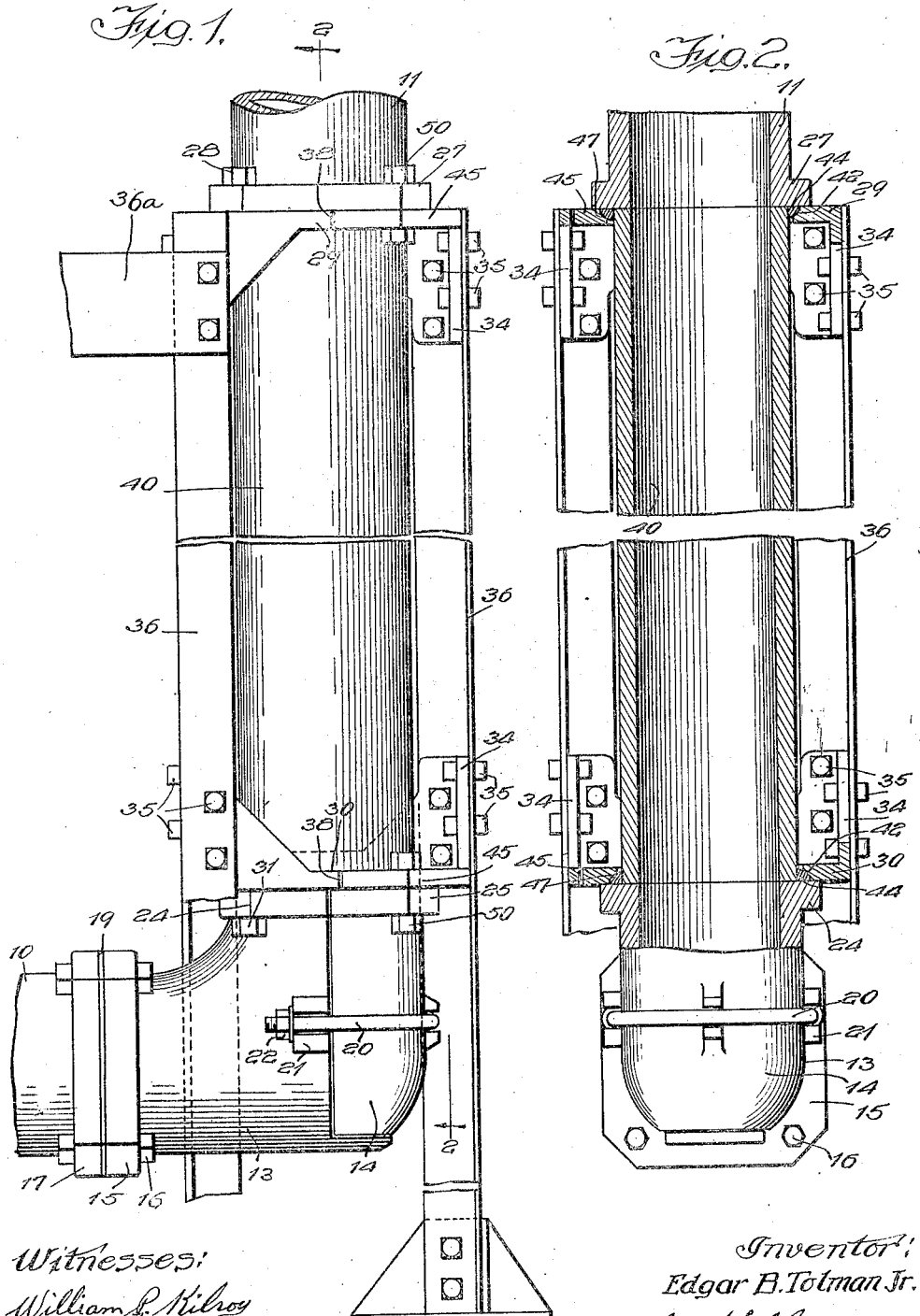

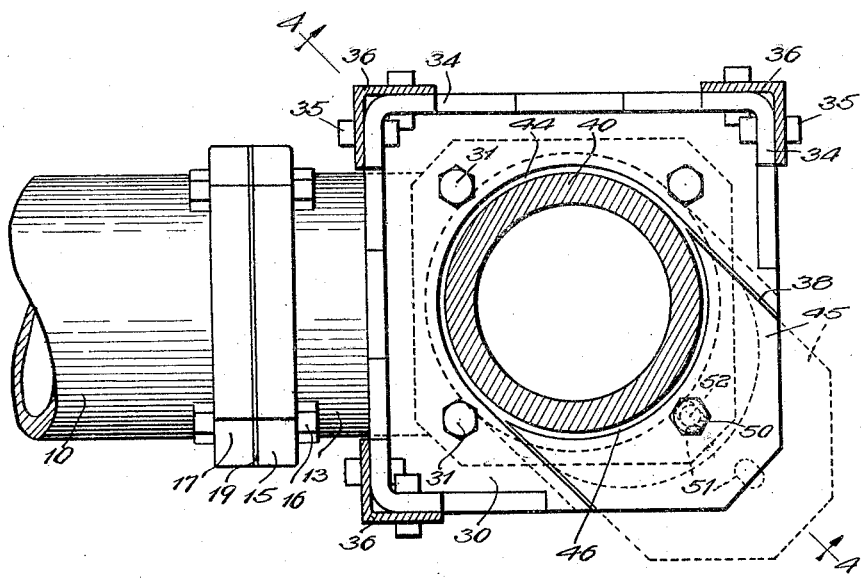

1,632,206

UNITED STATES PATENT OFFICE.

EDGAR B. TOLMAN, JR., OF CHICAGO, ILLINOIS, ASSIGNOR TO UNITED CONVEYOR CORPORATION, OF CHICAGO, ILLINOIS, A CORPORATION OF ILLINOIS.

CONVEYING APPARATUS.

Application filed July 3, 1925. Serial No. 41,414.

My invention relates to apparatus whereby ashes or similar materials are conveyed through a system of piping by suction or fluid pressure. More particularly my invention relates to fittings and pipe used in such a system. The invention has among its other objects the provision of apparatus of the kind described, which is simple, compact, convenient, durable, efficient and satisfactory for use wherever found applicable. A particular object of the invention is to provide improved apparatus of the kind described in which a part or parts thereof may be quickly and easily renewed. Another particular object of the invention is to provide improved apparatus of the kind described having a part or parts which may be readily adjusted to distribute the wear thereon. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a side elevation of a portion of a conveying system which embodies my invention;

Fig. 2 is a section taken on line 2—2 of Fig. 1;

Fig. 3 is a section taken on line 3—3 of Fig. 1; and

Fig. 4 is a section taken on line 4—4 of Fig. 3.

In the drawings, the invention is illustrated as it is preferably embodied in a system comprising a metal pipe line for conveying ashes or other similar materials. The material to be conveyed is subjected to suction or to a head of steam, compressed air or the like and is drawn or forced through the pipe line, the material being discharged into any suitable receptacle (not shown). The invention relates to certain pipe fittings and pipe adapted to be employed in such a system, and particularly to pipe fittings and pipe placed in the system at a point where there is a change in the direction of flow of the material.

Referring to the drawings, 10 is a conveying pipe connected to a continuing conveyor pipe 11 by a plurality of fittings. In the particular example illustrated the pipe 10 is horizontal and the pipe 11 extends at a right angle thereto. However, the particular direction of the pipes or the angle they make with each other are not necessarily as illustrated in the drawings. The means for connecting the conveyor pipe 10 with the continuing conveyor pipe 11 comprises an elbow fitting 13 having a wearback 14. The elbow 13 may be secured to the pipe 10 in any suitable manner, but in the illustrated embodiment of the invention the elbow 13 is provided with a flange 15 which is rigidly secured by bolts 16 to a flange 17 formed upon the pipe 10, a gasket 19 being provided between the flanges 15 and 17. The wearback 14 is detachably secured to the elbow 13 by a U-shaped bail or bolt 20 which is received by lugs 21 formed upon the elbow 13, nuts 22 being provided for securing the parts together.

The elbow 13 and the wearback 14 are provided with complementary flange portions 24 and 25, respectively, which are aligned with a flange 27 formed upon the conveyor pipe 11. Rigidly secured to the flange 27 by bolts 28 is a plate 29, the plate 29 being substantially identical with a plate 30 rigidly secured by bolts 31 to the flange portions 24 and 25. Formed integral with each of the plates 29 and 30 are lugs 34, the lugs 34 of the plate 29 being aligned with the lugs 34 of the plate 30. Bolts 35 rigidly secure an angle iron 36 to each pair of aligned lugs 34. Obviously, the pipe 11 is rigidly held in place relative to the elbow fitting 13. As shown, the angle irons 36 may extend to a floor or the equivalent to support the piping, or a strut or struts 36$^a$ may be employed to brace the piping, one end of each strut being rigidly secured to an angle iron 36 and the other end being rigidly secured to a wall, a column or the equivalent.

Each of the plates 29 and 30 is provided with a slot 38, which, at its inner end, is semi-circular in form to accommodate a pipe 40, the pipe 40 being of such length that it may be readily inserted between the flange 27 and the flange portions 24 and 25. The pipe 40 may be made of any suitable material and may be formed of a plurality of complementary sections, if it is so desired. Each slot 38 is undercut as at 42 to accommodate a gasket or packing member 44, the gasket or packing member 44 being of such diameter that it fits snugly around the pipe 40 and being compressible in the undercut portion 42.

Insertable into each slot 38 is a locking member or plate 45 provided at its inner end with an arcuate surface 46 forming a continuation of the semi-circular surface formed by the associated slot 38. The plate 45 is undercut as at 47 to form a continuation of the undercut portion 42 provided upon the corresponding plate 29 or 30. The plates 45 may be rigidly secured to the flange 27 and the flange portion 25 by bolts 50, each plate 45 being provided with a slot 51 adapted to receive one of the bolts 50 and the flange portion 25 and the flange 27 being each provided with a hole 52 aligned with the corresponding slot 51.

When the above described apparatus is assembled in the manner illustrated in the drawings, a conveyor system of the character described and of which the described apparatus forms a part may function in the usual manner, ashes or other material being conveyed through the system by subjecting the ashes or other material to suction or to fluid pressure. As is well known to those skilled in the art, the pipe 40 wears away when the material is being conveyed in a direction wherein it passes from the pipe 10 to the pipe 11 through the elbow fitting 13 and the pipe 40. Certain portions of the pipe 40 are subjected to the abrasive action of the ashes to a greater extent than other portions thereof, and therefore it is advantageous to adjust the pipe 40 at times with respect to the pipe 11 and the elbow fitting 13 to distribute the wear. My improved construction permits such adjustment to be quickly and easily made. Thus the portions 50 may be loosened to permit withdrawal of the plates 45 from the slots 38 distances limited by the slots 51. The pipe 40 may then be inverted end for end or may be rotated around its longitudinal axis to bring it into any desired position with respect to the pipe 11 and the elbow fitting 13. After the pipe 40 has been brought into the desired position the plates 45 are again forced into the slots 38 against the gaskets or packing members 44 and the bolts 50 are tightened.

When the pipe 40 has become so worn that it must be replaced by a similar pipe, the bolts 50 are first withdrawn from the plates 45 and the flange and flange portion 27 and 25, respectively. This permits the plates 45 to be withdrawn from the slots 38. The pipe 40 is then removed from its position between the flange 27 and the flange portions 24 and 25, this removal of the pipe 40 being made possible by the slots 38 provided in the plates 29 and 30. A new pipe 40 carrying the gaskets 42 is then inserted between the flange 27 and the flange portions 24, 25 and the plates 45 are returned to their normal positions in the slots 38, the plates 45 being secured to the flange 27 and the flange portion 25 by the bolts 50. Obviously, the angle irons 36 together with the plates 29 and 30 form a cage adapted to accommodate the pipe 40.

It will be noted that my improved construction makes it unnecessary to jack up the pipe 11 with respect to the elbow fitting 13 when the pipe 40 is to be brought into an adjusted position with respect to the pipe 11 and the elbow 13, or when the pipe 40 is to be replaced. The angle irons 36 hold the flange 27 a predetermined distance away from the flange portions 24 and 25 whether the pipe 40 is in its proper position or not. Obviously, the pipe 40 may be replaced with a minimum of effort.

In some instances I may prefer to dispense with the gaskets 42 and use in place thereof any suitable packing, such as asbestos, which may be tamped around the pipe 40 after it has been properly positioned between the fittings 11 and 13.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In apparatus of the character described, two tubular fittings, means for securing said fittings in spaced relation and including slotted plates secured to the fittings, a third tubular fitting having its ends removably positioned in said slots and aligned with said two fittings, and plates inserted in said slots for locking the third fitting against displacement relative to said two fittings.

2. In apparatus of the character described, two tubular fittings, means for securing said fittings to each other in opposed spaced relation, said means comprising slotted plates bolted to the opposed ends of said two fittings, and a third fitting having its ends seated in said slots and aligned with said two fittings and separably removable means inserted in said opposed slots for locking said third fitting against displacement relative to said two fittings.

In testimony whereof, I have hereunto signed my name.

EDGAR B. TOLMAN, Jr.